United States Patent [19]

Machate

[11] 4,146,781

[45] Mar. 27, 1979

[54] DATA CARRIER, METHOD AND APPARATUS FOR PLACING DATA ON THE CARRIER, AND DEVICE FOR READING DATA FROM THE CARRIER

[76] Inventor: Jürgen Machate, Asslkofener Strasse 32, D-8019 Ebersberg, Fed. Rep. of Germany

[21] Appl. No.: 755,294

[22] Filed: Dec. 29, 1976

[30] Foreign Application Priority Data

Dec. 29, 1975 [DE] Fed. Rep. of Germany ....... 2558917
Nov. 18, 1976 [DE] Fed. Rep. of Germany ....... 2650959

[51] Int. Cl.² .......................... G06K 7/08; G05B 1/00
[52] U.S. Cl. ............................ 235/439; 235/448; 235/492
[58] Field of Search ............... 235/61.12 C, 61.12 R, 235/61.12 N, 61.11 H, 61.11 A, 492, 439, 448; 365/101

[56] References Cited

U.S. PATENT DOCUMENTS

| 3,296,487 | 12/1966 | Scott | 235/61.11 |
|---|---|---|---|
| 3,312,372 | 4/1967 | Cooper, Jr. | 235/61.11 |
| 3,508,031 | 4/1970 | Cooper, Jr. | 235/61.11 |
| 3,564,214 | 2/1971 | Cooper, Jr. | 235/61.11 |
| 3,632,995 | 1/1972 | Wilson | 235/61.12 N |
| 3,808,406 | 4/1924 | Oberg | 235/61.12 N |
| 3,857,019 | 12/1974 | Holtey | 235/61.11 A |
| 3,911,252 | 10/1975 | Meyer | 235/61.11 |

*Primary Examiner*—Vincent P. Canney
*Attorney, Agent, or Firm*—Silverman, Cass & Singer, Ltd.

[57] ABSTRACT

A nonconductive data carrier has arrays of ring-shaped metallic lamina in each data location, on one surface thereof, for providing information to be inductively read. The information or data is placed on the carrier by removing a portion of predetermined rings to separate the ring. A ring which is not separated will reduce the magnetic coupling when the rings are placed in a magnetic field during inductive reading of the data, while a separated ring will not reduce the magnetic coupling. The ring portions may be removed mechanically, by milling or grinding, or by melting the ring portion. The ring portion may be melted by a capacitive discharge between two electrodes placed on the ring portion to be removed or by inducing a sufficiently strong short-circuit current in the ring to melt the ring portion. A device for inductively reading information or data from the carriers, in the form of cards having channels or rows of rings, includes an array of transmitting coils, one coil corresponding to each channel of rings. An array of receiving and reference coils are placed opposite the transmitting coils so the carrier cards may be moved between the transmitting and the receiving coils. The reading device detects voltages induced by the magnetic fields from the respective transmitting coils in the respective receiving and reference coils. The rings without a portion removed will couple a magnetic signal of less magnitude than those with a portion removed. A control switches the information received into a memory device for further use. The cards may also include control channels and orientation lamina to indicate to the control the position the card is in and the location of the card in the reading device so the information or data will be correctly read.

5 Claims, 11 Drawing Figures

DATA CARRIER, METHOD AND APPARATUS FOR PLACING DATA ON THE CARRIER, AND DEVICE FOR READING DATA FROM THE CARRIER

BACKGROUND OF THE INVENTION

The invention relates to data carriers having ring-shaped metallic lamina in each data location and means for removing portions of predetermined lamina and means for reading the information on the data carriers resulting from the removal of the ring portions.

The data carriers are used in various fields including for instance, identity cards, admission tickets, or contactless incremental transmitters where the information in the form of metal lamina is put on electrically non-conducting cards or plates of plastic or other synthetic material. The existence or nonexistence of these lamina in spatially fixed places on the carrier cards determines the data content of such carriers. The information may be placed on the cards either by gluing prefabricated metal lamina onto one surface of the cards or by etching off metal films which were previously placed on the cards. The recognition of the metal lamina is based on the decrease of the electromagnetic coupling between two coils when the metal lamina is passed between the coils.

These well-known processes for placing of the desired information on a data carrier have the disadvantage that they can be carried out only with the help of expensive and complex machinery, therefore, being generally practical only at the place where the data carriers are produced. Production of the data carriers at one central location and placing the information on the data carriers at many decentralized locations with the use of simple and hence inexpensive arrangements is therefore not possible.

The invention is based on the concept of developing a process of placing the information on the cards which permits a simple and reliable notation of the desired information on the data carriers or cards without the complex machinery of the prior art.

The problem is solved by the invention by placing ring-shaped metal lamina on each data location intended for utilization. The desired information is then placed on the data carrier by removing a portion of the rings in predetermined locations in such a way that the formation of the short-circuit current, which originates under the influence of a magnetic field, is prevented by the removed portion of the rings and therefore the magnetic coupling is not decreased during inductive reading or scanning.

For instance, identification cards may be produced uniformly and efficiently by means of the invention and the programming or placing of the information takes place in a simple and reliable manner by the individual user of the identification card, for instance, the respective branch banks of a central bank. In a like manner, the contactless incremental transmitters or program transmitter plates, which are adjusted to the needed control functions at each users location, can be etched uniformly.

In one embodiment of the invention the removal of a portion of the ring takes place by melting off the ring portion. Preferably, the melting off takes place by means of a capacitor discharge from a capacitor which is charged to a correct level from a direct current source through a compensating resistance. The ring portion may also be melted off by means of a short-circuit current induced in the ring of a sufficient magnitude. For instance, the short-circuit current may be provided by means of a transmitter coil such as present in a reading device which is fed by a high frequency source.

The apparatus or arrangement for melting off the desired ring portions may consist of a pair of electrodes connected to a capacitor with a compensating resistor and a direct current source or battery connected to the capacitor. The apparatus may be designed as a hand-held crayon-like cylinder. The apparatus may have a lamp connected in parallel with the capacitor, with the brightness of the lamp indicating the state of charge of the capacitor, and which thereby will signal the removal of the ring portion by a momentary extinguishing of the lamp when the capacitor is discharged.

According to another embodiment of the invention, the ring portion may be mechanically removed.

The invention also relates to a system for inductive reading of the data or information which is placed on the nonconductive card-shaped carriers by means of metallic information elements placed on the carriers in predetermined locations. Card-shaped and machine readable data carriers having the information carried thereon by the existence or nonexistence of metallic lamina are employed to an increasing extent for identification, transportation tickets and admission tickets. Compared to other types of data carriers which can be read optically or magnetically, this type of data carrier with metallic lamina on one surface has the advantage of being a great deal more sturdy. The additional advantages of security against visual recognition or reading and security against fraud are produced by locating the metallic lamina between two opaque and inseparable layers of the data carrier.

The prior well-known reading reading devices for the recognition of metallic lamina information elements consist of several reading places each of which consist of a coil for the generation of a magnetic field, whose magnitude changes with time, and a secondary associated coil. Voltage is induced in the secondary coil which is proportional to the magnitude and time change of the primary coupling magnetic field and whose amplitude is utilized for the recognition of the information. A lower voltage is induced if a metallic lamina is moved between the primary and secondary coil because of the short-circuit current induced in the lamina. The generation of the magnetic field may take place by a generator or, for instance, also by a capacitor discharge. The individual data locations may be controlled and read simultaneously or in groups in a predetermined chronological order. The metallic information elements are usually solid flat metallic lamina.

The previous reading arrangements have the disadvantage that for the recognition of the data or information they require a relatively large reduction of the coupling of the magnetic coupled field and therefore require metallic information elements with a large surface dimension. These reading devices also are not provided with an automatic transport device so that the carrier or card is pushed into the reading device up to a mechanical stop and then subsequently the data or information is read from the card. Reading units, consisting of a primary and secondary coil, must therefore be provided for each possible data location.

The invention also includes a noncomplex device for the inductive reading of the data which makes possible reliable recognition of very small dimensioned metallic information elements. Furthermore, a data carrier of the invention includes data locations for the control of the reading device in such a way that the corresponding reading device contains a substantially fewer number of reading units without having a motor drive or other automatic transport device. The cards are also provided with orientation lamina so that the reading device will correctly recognize the information content of the card independent of the position or orientation of the card in the reading device.

Each reading unit of the inductive reading device consists of a transmitting coil generating a magnetic alternating flux and two receiving coils which are electrically coupled to one another by means of a bridge circuit and which are spatially arranged relative to one another such that the voltage in each receiving coil is of the sample amplitude and the same phase. When a magnetic information element passes between the coils causing a short-circuit current in the element the alternating magnetic field is influenced in such a way that the proportion of the alternating voltage induced in the two receiving coils changes and the bridge circuit is detuned.

In the reading device of the invention, several reading units are arranged adjacent to one another and one reading unit after the other is switched on in a chronologically determined sequence by a control mechanism for scanning the information contents of a series of information or data locations.

The invention also includes a data carrier having the rings of the invention to be utilized in the reading device of the invention. The data carrier may have several rows or channels of the metallic rings on an electrically nonconducting carrier material. Each ring of the data carrier may have a narrow cross-bar to provide the portion of the ring which is to be removed where desired.

Two inductively readable control channels are placed on the data carrier to trigger the reading cycle of the reading device as well as for the timing control for the storing of the data. The control tracks or channels also indicate the moving direction of the card to the reading device. Two orientation lamina or otherwise inductively readable marks are placed on the data carrier in a spatial arrangement such that the reading device, which scans the orientation lamina at the beginning of the reading action, detects which of the four possible positions the data carrier card has been placed in the reading device.

SUMMARY OF THE INVENTION

The above and other disadvantages of prior art data carriers and information placing and reading techniques are overcome in accordance with the present invention by providing a nonconductive data carrier card with metallic rings placed in each data location. The metallic rings include a narrow cross-bar portion which may be melted or otherwise removed to change the information content of the data location. A device for melting the cross-bar includes a capacitor connected to two spaced-apart electrodes which is charged by a direct current source through a limiting resistor. The capacitor will discharge when the electrodes are placed in contact with the cross-bar of a ring to melt the cross-bar away to separate the ring. The data locations are arranged in rows or channels and a reading device includes one reading unit for each row or channel. Each reading unit consists of a transmitting coil and a receiving and reference coil. A control is provided to actuate the reading units as the data card is moved into the reading device between the transmitting and the receiving coils. A reference coil is spaced adjacent each receiving coil and spatially oriented such that the output of a bridge circuit connected to the receiving and reference coil is unbalanced when a ring with its cross-bar portion intact is passed over it. The data card includes two orientation lamina to indicate which of the four possible positions the data card is in in the reading device.

DESCRIPTION OF THE PREFERRED EMBODIMENT

Figure 1:
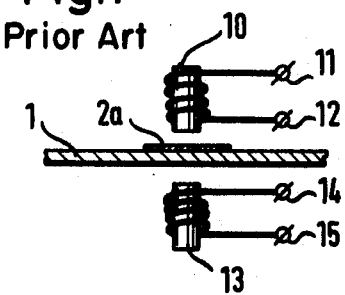
FIG. 1 is a side view of a reading arrangement of a data carrier as provided in the prior art.
Figure 2:
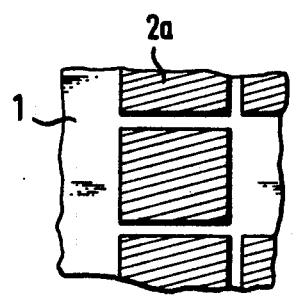
FIG. 2 is a detailed top view of a data carrier partially illustrated having metallic lamina as provided by the prior art.

Referring now to FIGS. 1 and 2, the data carrier 1 and reading arrangement of the prior art is illustrated. A metallic lamina 2a having a large solid area is placed on the electrically nonconducting flat carrier 1. The metallic lamina 2a present a large solid surface. The presence or absence of the metallic lamina 2a is detected or read by a transmitting coil 10 magnetically coupled to a receiving coil 13. The transmitting coil 10 is connected to a high frequency alternating voltage source (not shown) via two input leads 11 and 12 to generate an alternating magnetic field. The receiving coil 13 generates a secondary voltage from the magnetic field on its output leads 14 and 15. When a metallic lamina 2a is moved between the coils 10 and 13, the electromagnetic alternating field of the coil 10 induces a short-circuit current in the lamina 2a whose alternating field is opposite to the induced alternating field. The alternating field effective on the receiving coil 13 is thus decreased with a corresponding decrease in the secondary output voltage on output leads or terminals 14 and 15. This voltage decrease is used for the recognition of the metallic lamina. When a data location does not have a metallic lamina there is no voltage decrease on the output leads 14 and 15.

Figure 3:
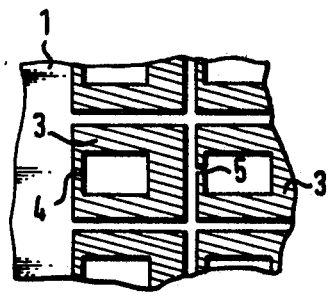
FIG. 3 is a detailed top view of a data carrier of the invention partially illustrated with the ring-shaped metallic lamina of the invention.

The metallic lamina or rings 3 of the invention are best illustrated in FIG. 3. Each of the rings 3 consist of a ring-shaped metallic lamina, which preferably has a narrow cross-bar 4. When the ring 3 is moved between the coils 10 and 13 there is again generated a short-circuit current in the same manner as in the full lamina 2a discussed previously, which leads to a reduction in the magnetic coupling. The ring 3 may be separated by providing a break or gap 5 in the ring, most preferably in the cross-bar 4. When the ring 3 is separated by the break 5 the short-circuit current will not be developed and essentially no decrease in the magnetic coupling will occur when the separated ring is passed between the coils 10 and 13. The separated ring 3 will now magnetically appear the same as the data locations of the prior art which do not contain a lamina. The break or gap 5 may be very narrow since the induced voltages in the ring 3 are very low. In this manner, all the data locations may be manufactured with a ring 3, which may be made to act like an empty field by the slight contact sufficient to make a break or gap 5 in a cross-bar 4.

Figure 4:
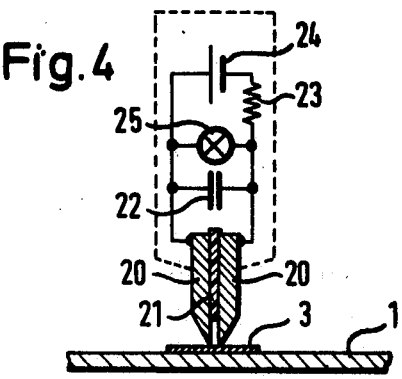
FIG. 4 is a partially schematic side view of an arrangement for placing the information on the data carrier of the invention.

FIG. 4 illustrates one noncomplex arrangement to provide for the separation of the rings 3. Two blade-like electrodes 20 are electrically insulated by means of a narrow layer of insulation 21. A capacitor 22 is connected in parallel with the electrodes 21 and is charged by a direct voltage source 24 through a compensating resistor 23. When the electrodes 20 are pressed against the cross-bar 4 of the lamina or rings 3 of a carrier the capacitor 22 will discharge across a portion of the cross-bar 4. By the appropriate dimensioning of the capacitor 22, of its charging voltage, and of the distance between the two electrodes 20, the discharge current may be selected to be sufficiently high so that a portion of the cross-bar 4 melts off to produce the gap or break 5.

A lamp 25 may be connected in parallel with the capacitor 22 to provide a visual indication of whether a complete gap or break 5 has been acommplished. When the electrodes 20 are pressed against the cross-bar 4, the capacitor 22 is discharged and the lamp 25 will extinguish. During the subsequent recharging of the capacitor 22, the lamp 25 will again begin to light. If the cross-bar 4 has not been melted to produce the gap or break 5 the lamp remains dark; however, if insufficient contact was made with the cross-bar 4 the capacitor 22 will not discharge and the lamp 25 will continue to remain brightly lit.

As indicated by the dashed light (no reference number) in FIG. 4, the ring separating the arrangement is designed as a crayon-like cylinder for compactness and ease of handling. The rings 3 may be made of electrically conducting material with a low melting temperature to faciliate the separation of the cross-bar 4 to form the break or gap 5. Altenately, it is possible to induce a sufficiently high short-circuit current in the ring 3 with a transmitting coil, such as the coil 10 in the arrangement of FIG. 1, which is sufficient to melt the narrow cross-bar 4 to produce the break 5.

It is also possible to form the break in the ring 3 by mechanically removing a portion of the ring. This may be done by any convenient method such as by rotating milling or grinding devices.

Figure 5:
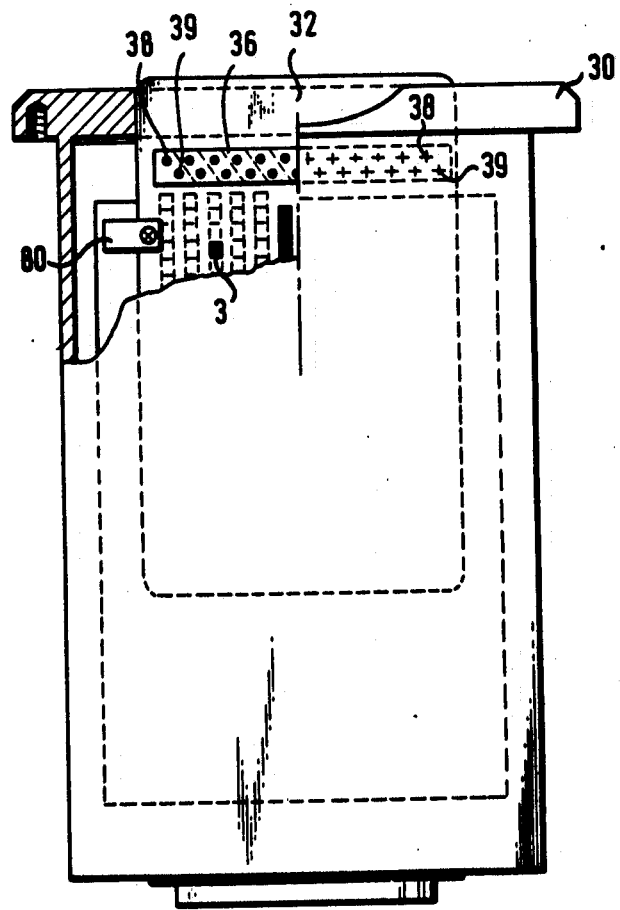
FIG. 5 is a top view partially sectioned of a reading device of the invention.
Figure 6:
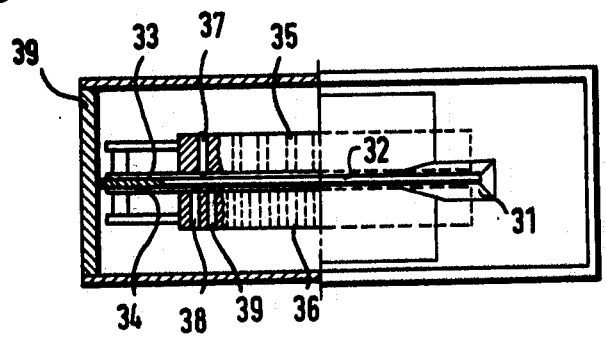
FIG. 6 is a partially sectioned front view of the reading device of the invention.

The reading device of the invention is best illustrated in FIGS. 5 and 6 which includes a housing 30 with an opening or mouth 31 to receive a data carrier in the form of a card 32. In the reading device, the card 32 is guided between two plates 33 and 34. The recognition or reading of the data information takes place during the pushing in of the card 32 by the reading blocks 35 and 36 which are arranged close to the opening 31. The reading blocks 35, 36 include several, here twelve, reading units each of which consists of a transmitting coil 37, a receiving coil 38 and a reference coil 39.

Figure 7:
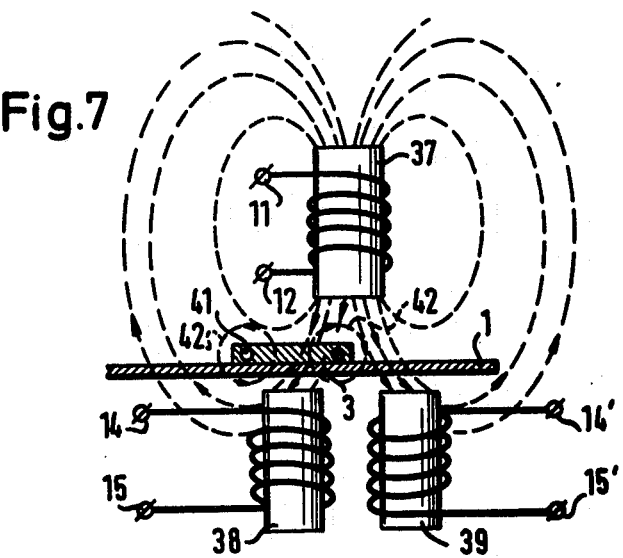
FIG. 7 is a side view of the reading arrangement of the invention.
Figure 8:
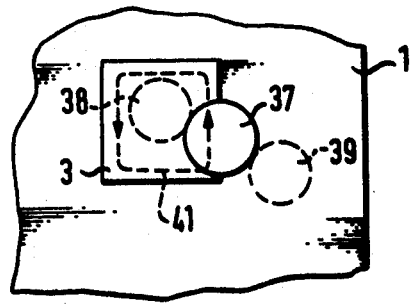
FIG. 8 is a partial top view of FIG. 7.

The reading units are best illustrated in FIGS. 7 and 8. The coils 37, 38 and 39 are spatially arranged such that their center axes are oriented parallel and where the receiving coil 38 as well as the reference coil 39 are shifted or offset to the side by the same distance from the extended center axis of the transmitting coil 37. The distance of each of the coils 38 and 39 from the transmitting coil 37 is identical. An alternating voltage generator 40 is connected to the terminals or input leads 11 and 12 of the transmitting coil 37 to form an alternating magnetic field. The alternating magnetic field induces alternating voltages in the coils 38 and 39 which can be detected and measured on the output leads 14 and 15 of the coil 38 and on output leads 14' and 15' of the coil 39. Because the coils 38 and 39 are symmetrically arranged and the same distance from the coil 37, the voltages induced in each of them are substantially the same amplitude and the same phase.

When a metallic lamina such as 2a or 3 is moved between the transmitting coil 37 and the receiving coil 38, part of the alternating magnetic field will induce in the lamina 2a or 3 an alternating voltage which brings about a short-circuit current 41. In turn the alternating short-circuit 41 produces a secondary magnetic field 42 which is directed in such a way that it weakens the primary magnetic field in the area of the receiving coil 38, but increases the primary magnetic field in the area of the reference coil 39. In this manner, the induced voltage on the output leads 14 and 15 of the receiving coil 38 is reduced and simultaneously the induced voltage on the output leads 14' and 15' of the reference coil 39 is increased. The induced voltages are substantially uneffected by a data location without a lamina 2a in a prior art arrangement or a data location with a separated ring 3, having a gap 5, of the invention.

Figure 9:
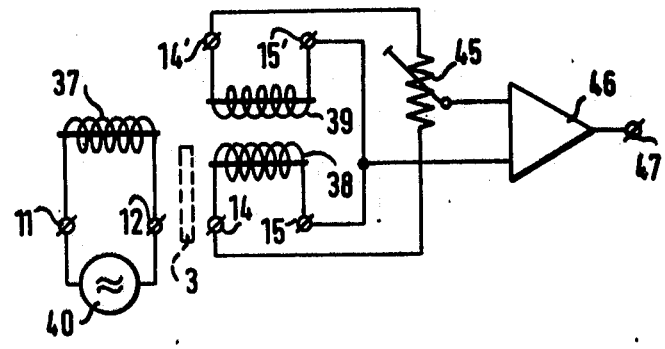
FIG. 9 is a schematic diagram of a reading unit of the reading device of the invention.

This induced voltage effect is utilized in the bridge circuit illustrated in FIG. 9. When a metallic lamina 2a or ring 3 which is not separated are not present, the bridge is balanced by means of a potentiometer 45 such that the alternating voltage existing at the input stage of an amplifier 46 becomes almost zero, because the induced voltage on output leads 14 and 15 is canceled by the induced voltage on the output leads 14' and 15'. When a metallic lamina 2a or unseparated ring 3 is moved between the transmitting coil 37 and the receiving coil 38, the voltage on the output leads 14 and 15 is reduced while the voltage on the output leads 14' and 15' is increased, which detunes the electrical bridge. The output voltage will no longer be zero and the output voltage is then amplified in the amplifier 46 which produces an output signal to be utilized at an output terminal 47 of the amplifier 46.

Figure 10:
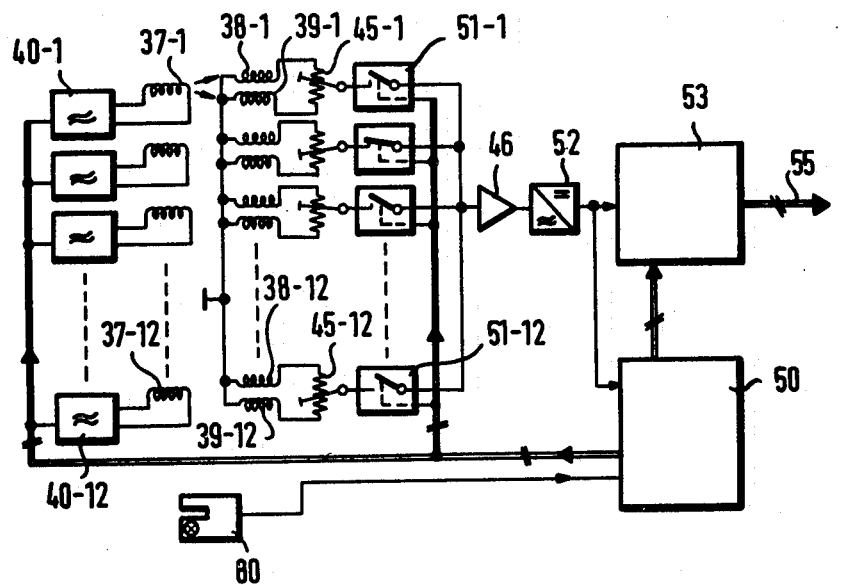
FIG. 10 is a schematic diagram of the reading device of the invention.

The circuit diagram of the reading device is illustrated in FIG. 10. A control mechanism 50 cyclically switches on one of the oscillator stages 40-1 through 40-12 which provides an input to its corresponding transmitting coil 37-1 through 37-12. The corresponding bridge circuits including the receiving coils 38-1 through 38-12, the reference coils 39-1 through 39-12 and the potentiometers 45-1 through 45-12 are simultaneously switched through to the input stage of the amplifier 46 by means of their corresponding switch 51-1 through 51-12. The output signal from the amplifier 46 is coupled to a rectifier 52 and the output signal of the rectifier 52 is coupled both to the control mechanism 50 and a memory device 53. The orienting of the memory location in the memory device 53 during the registering of the signal produced by each reading unit is also controlled by the control mechanism 50 and synchronized with the cycling of the reading units. The data from the memory 53 can then be read out by way of an output line 55 to be utilized in a utilization device, such as a printer or visual reader (not shown).

Figure 11:
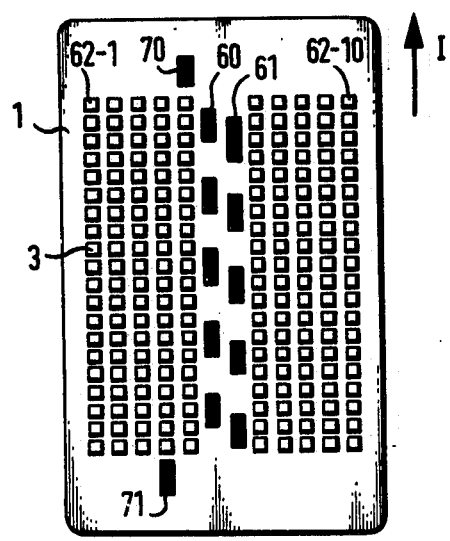
FIG. 11 is a top view of a data carrier of the invention.

A data carrier card of the invention is illustrated in FIG. 11. The case of the card 1 is a nonconducting material such as plastic or paper. Two control channels or tracks 60 and 61 as well as 10 information channels or tracks 62-1 through 62-10 are arranged symmetrical with the center line of the card. Each of the information elements consists of a closed ring 3 of conducting material of the invention. The card could also be utilized with the prior art metal metallic lamina 2a with a lamina corresponding to a closed ring 3 and a missing lamina 2a corresponding to a separated ring 3 with the gap 5.

In operation the card 1 is guided into the reading device in the direction of the arrow I in such a way that the receiving coils 38 are located approximately above the center of the respective tracks 62-1 through 62-10, while the reference coils 39 are between two tracks which are at a distance from one another. The transfer and storing of a line of information takes place with every change of the information from one of the control tracks 60 and 61 which can be shifted relative to one another. The information of the other control track 60 or 61 provides the reading device with the recognition of the direction of movement of the card and causes in the control mechanism 50 an increase or a reduction by one of the line orientation which is transmitted to the memory 53. The normal recognition of the entire data content of the data card takes place line by line with reading and storing taking place during the continuous pushing of the card 1 into the reading device. Faulty reading caused by the alternate pushing in and pulling out of the card 1 during the reading action is prevented by the recognition of the moving direction described above.

In addition, two inductively readable orientation marks 70 and 71 are provided to indicate the position of the card 1 in the reading device. When the card 1 is pushed into the reading device, the beginning of the card is recognized with a light barrier 80 shown in FIGS. 5 and 10, which is utilized by the control mechanism 50 to interrogate or recognize the information on one of tracks 62-4, 62-5, 62-6 and 62-7 which correspond to the four possible positions of the card in the reading device. The two marks 70 and 71 are arranged on the card 1 such that only one of these tracks will contain one of the marks 70 and 71 at the start of the reading operation. Since the reading device recognizes the position the card has been inserted, because of the orientation marks 70 and 71, the correct data may be read from the card with no concern about the position of the card in the reading device.

Many modifications and variations of the present invention are possible in light of the above teachings. It is, therefore, to be understood that within the scope of the appended claims, the invention may be practiced otherwise than as specifically described.

What is claimed and desired to be secured by Letters Patent of the United States is:

1. An inductive reading device for reading data in the form of metallic information elements located in a predetermined arrangement on a nonconductive card-shaped data carrier, said reading device comprising:
   at least one reading unit, each unit including transmitting coil means for generating an alternating magnetic field and two receiving coil means spatially arranged so that said transmitting coil means induces voltages of substantially the same amplitudes and phases in said two receiving coil means, said transmitting coil means located opposite said two receiving coil means with a gap therebetween through which said data carrier elements are passed, said two receiving coil means electrically coupled to bridge circuit means which is tuned to generate a substantially zero magnitude output signal when a ferromagnetic metallic element is not between said transmitting and said receiving coil means, said bridge circuit means generating an output signal of a finite magnitude when a ferromagnetic metallic element is placed between said transmitting and said receiving coil means offset toward one of said two receiving coil means by, said magnetic field causing a short-circuit current to flow in said element to induce voltages of unequal amplitudes or phases in said two receiving coil means by increasing the amplitude of the voltage in one of said two receiving coil means and decreasing the amplitude of the voltage in the other one of said two receiving coil means to detune said bridge circuit means.

2. A reading device as claimed in claim 1 further including:
   a multiple number of said reading units spatially arranged next to one another, said transmitting and receiving coil means of each unit having a central axis with each pair of receiving coil means having their axes offset substantially equidistant from said transmitting coil means axis, said data carrier elements being passed between the coil means of each unit one at a time; and
   control means to actuate said reading units in a predetermined time sequence to scan the information content of a series of said information elements.

3. A data carrier to be inductively read by coupling a magnetic field across the carrier, said carrier comprising:
   a nonconductive layer of material;
   a multiple number of ring-shaped electromagnetic metallic elements arranged on said nonconductive material, one element in each data location; and
   two inductively readable orientation marks spatially arranged on said carrier both laterally and longitudinally offset from one another for making the particular one of four possible positions of said carrier recognizable when being inductively read.

4. A data carrier as claimed in claim 3 wherein:
   each of said ring-shaped elements includes a narrow cross-bar portion adapted to be easily removed to separate said ring; and
   said elements are arranged in a multiple number of rows.

5. A data carrier as claimed in claim 4 further including:
   two control tracks arranged substantially parallel to said element rows, each of said tracks including means for making the moving direction of said carrier recognizable when being inductively read.

* * * * *

UNITED STATES PATENT AND TRADEMARK OFFICE
CERTIFICATE OF CORRECTION

PATENT NO. : 4,146,781
DATED : March 27, 1979
INVENTOR(S) : JÜRGEN MACHATE

It is certified that error appears in the above–identified patent and that said Letters Patent are hereby corrected as shown below:

On the Title page, in the priority information block [30] second line thereof, change "Nov. 18, 1976" to --Nov. 8, 1976--

Signed and Sealed this

Twenty-fifth Day of September 1979

[SEAL]

Attest:

Attesting Officer

LUTRELLE F. PARKER

Acting Commissioner of Patents and Trademarks